Figure 1:
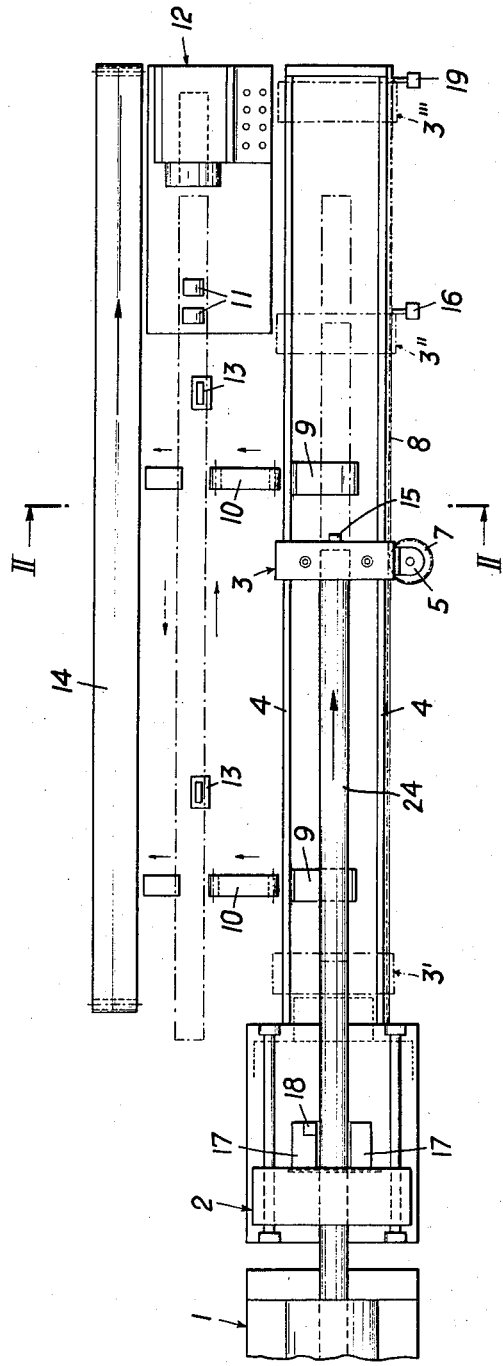

United States Patent
Breitfuss

[15] 3,689,190
[45] Sept. 5, 1972

[54] APPRATUS FOR FORMING A TUBE SOCKET ON A TUBE CONSISTING OF THERMOPLASTIC SYNTHETIC MATERIAL

[72] Inventor: Roman Breitfuss, Krems, Australia
[73] Assignee: Inteco Establishment, Vaduz, Liechtenstein
[22] Filed: July 17, 1970
[21] Appl. No.: 55,738

[30] Foreign Application Priority Data
Aug. 7, 1969 Australia .............. A 7616/69

[52] U.S. Cl. .................. 425/392, 72/342, 425/164, 425/306, 425/378
[51] Int. Cl. ........................................ B28b 11/08
[58] Field of Search......... 18/12 TF, 14 R, 14 A, 14 S, 18/4 P, 4 S; 25/39; 264/173, 209, 267; 164/82; 72/342; 425/164, 306, 378, 380, 381, 392, 404

[56] References Cited
UNITED STATES PATENTS
2,666,947   1/1954   Shaw ....................... 18/14 A
3,360,826   1/1968   Lorang .................... 18/19 TE
3,517,725   6/1970   Watts ....................... 164/82

Primary Examiner—J. Spencer Overholser
Assistant Examiner—Lucius R. Frye
Attorney—Strauch, Nolan, Neale, Nies & Kurz

[57] ABSTRACT

A tube of thermoplastic synthetic material is formed in automatically continual operations. The leading end of a tubular slab of such material being extruded from an extrusion unit projects into a movably mounted preheater which is pushed thereby at extrusion speed. After the preheater has moved a predetermined distance, the extruded slab is severed and the speed of the preheater is accelerated by connecting it to a drive mechanism to longitudinally separate the severed tube from the extruding slab. The severed tube is now transferred automatically to a socket forming station where the preheated end is thrust into a socket forming device.

11 Claims, 4 Drawing Figures

FIG. I

INVENTOR
ROMAN BREITFUSS

INVENTOR
ROMAN BREITFUSS

APPRATUS FOR FORMING A TUBE SOCKET ON A TUBE CONSISTING OF THERMOPLASTIC SYNTHETIC MATERIAL

The invention refers to a process for forming a tube socket at one end of a tube consisting of thermoplastics (thermoplastic synthetic material) and obtained by severing an extruded tubular slab emerging from an extruder. The invention further refers to an apparatus for performing said process.

It is known to produce tubes consisting of thermoplastics and provided with tube sockets by extruding a tubular slab and severing said slab into tubes of the desired length. For forming a tube socket at one end of tubes so produced, it is necessary to reheat said tubes at their respective end prior to shaping said end in a tube socket forming device. When producing such tube sockets it was, up till now, common practice to remove the extruded tube, having been given the desired length, from the extruder, and to introduce said extruded tube into a preheating device for preheating the tube end in question for the subsequent shaping of the tube socket. Such a process, however, is cumbersome and time-consuming for the reason that for both, preheating of the tube end and forming of the tube socket, operation steps become necessary which are quite independent from extruding the tubular slab and from severing the tubular slab. Such a known process further suffers from the drawback that the tube end, after extrusion, completely cools down to ambient temperature and, therefore, must as a whole be reheated with accompanying heat waste. In view of the, frequently considerable, wall thickness of the tubes, uniform reheating of the tube wall throughout its thickness is rather difficult and can only be accomplished within relatively long time intervals, so that such reheating is quite time-consuming. Such reheating is further problematic because, on forming the tube socket, the wall thickness is to be increased.

The present invention now aims at avoiding such drawbacks, and seeks to provide a process for forming a tube socket at one end of a tube consisting of thermoplastic material in a more economic manner. In a process for forming a tube socket at one end of the tube consisting of thermoplastic synthetic material and obtained by severing an extruded tubular slab, wherein the tube end is heated and subsequently formed to the tube socket, the invention essentially provides the improvement that heating of the tube end is effected during the movement of the tube in the course of the extrusion process. When performing the process according to the invention, it is now no more necessary to preheat the tube end in a separate operation step; on the contrary, preheating of the tube end is effected simultaneously with the extrusion of the tubular slab and, if desired, simultaneously with severing the tubular slab into tubes. Thus it is not only possible to save time, but it is also possible to make the whole production of a socket tube, consisting of thermoplastic material, a fully automatic one, since it is not necessary to remove the tube from the extruder for the purpose of preheating the tube end to be given the shape of a tube socket. The tube coming from the extruder will only superficially cool down, maintaining in its inner portions a temperature comparable to the extrusion temperature. Heating of the tube end is effected from its outside. In view of the tube end being reheated according to the invention immediately after emerging from the extruder and reheating taking place from outer layers to inner layers, equalization of temperature within the tube end is achieved. There is not only saved heat energy, but there is also warranted uniform heat soaking of the tube end to be deformed without the necessity of having to heat the tube end for a longer period of time. As a whole, the quality of the tube socket is improved. The invention is of special advantage for certain thermoplastics, for example rigid polyvinyl chloride, because such thermoplastics only allow a low temperature gradient in the preheating device.

According to the invention, the temperature of the heat source is adjusted so that heating of the tube end is completed at the latest when severing of the tube slab has been completed. This seems at any rate possible because the heating period is relatively short when working according to the inventive process. Based on constant weight of thermoplastic material extruded, tubes of different dimensions are extruded at different speeds, which results in different periods of treatment of the tube end in the preheating device for different tube dimensions. This fact may be taken into account by empirically adjusting the temperature of the preheating device.

An apparatus for performing the process according to the invention comprises, in a manner known per se, an extruder for extruding the tubular slab and a subsequent severing device for dividing the tubular slab into tubes, and is characterized in that, seen in delivery direction of the tubular slab, a preheating device, receiving the tube end to be provided with a socket is arranged behind the severing device coaxially to the tubular slab for movement along a path and in that, following the preheating device, a tube socket forming device is provided behind or beside the preheating device. The preheating device and the tube socket forming device may be constructed in a usual manner. In view of the preheating device being provided immediately behind the extruder and the severing device, it becomes possible to introduce the tube end to be provided with a socket into the preheating device immediately after it emerges from the severing device and to maintain the contact between the tube end and the preheating device during shifting of the preheating device along its path of movement. The preheating device can be kept in operative contact with the tube end also during severing of the tubular slab, so that the total time necessary for extruding a length of the tubular slab and for severing said tubular slab can be made use of for preheating the tube end to be provided with a socket.

Conveniently, the preheating device is driven by a reversible drive means, said drive means being controllable by switches actuable in dependence on the position of the tube. With this arrangement, it is possible to control said drive means in a fully automatic manner, and to make the arrangement such that the preheating device takes up the tube end to be preheated, that the preheating device is shifted along its path of movement by the tube end, that the preheating device, after completion of the preheating step, releases said tube end, and that then the preheating device returns to the starting position in which the preheating device can take up the tube end of the following tube. According to the invention, the drive means comprises a motor fixed to the preheating device, and having its drive shaft connected to a drive wheel, for instance a gear or a sprocket cooperating with a tooth rack or a stationary chain, respectively. By fixing the motor of the drive means to the preheating device, said drive means may without difficulties be controlled by end switches or the like. If the motor is an electro motor, e.g., a three phase motor, two revolution speeds may be selected by suitably connecting its poles. According to the invention, the arrangement can be such that said drive means comprises a selectively operable clutch and a brake, for example a magnetic clutch and a magnetic brake, linked between motor and drive wheel. Conveniently, said drive means is arranged for moving the preheating device with a speed exceeding extruding speed.

According to the invention, an ejector may be arranged adjacent to the path of movement of the preheating device for laterally ejecting the tube preheated at its end onto a conveyor belt or the like, which is arranged between the preheating device and the tube socket forming device, and which delivers the tube, having one of its tube ends preheated, to the tube socket forming device. Said ejector may be adapted for initiating, after the ejection step is completed, return of the preheating device into the starting position, i.e., that position in which the preheating device may take up a further tube end emerging from the severing device.

It has proved convenient to provide an interchangeable insert for the preheating device, so that the preheating device an be adapted to different tube diamenters, and thus an apparatus according to the invention can be used for forming tube sockets at one end of tubes of different dimensions.

According to a preferred embodiment of the invention, the preheating device is shifted in extrusion direction by the tube during the preheating period, is moved in extrusion direction with a speed exceeding extrusion speed after completion of the preheating step, and is returned in its starting position after ejecting the tube in direction to the tube socket forming device. In this manner it is quite simple to establish synchronism between the preheating device and the tube end, and to release the tube end from the preheating device at the proper moment, so that the tube, with one of its ends preheated, can be ejected and there is no hindrance for continuously extruding the slab. The next tube end is then preheated in the same manner as described.

The invention is further illustrated with reference to the accompanying drawing which schematically shows an embodiment of a device according to the invention.

Figure 2:
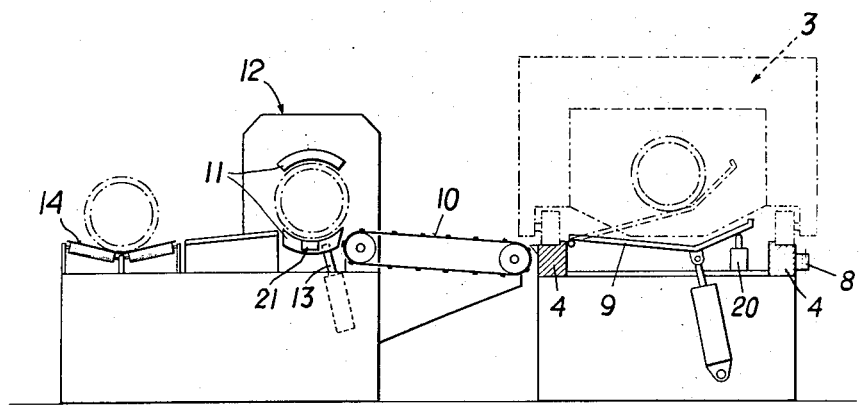
Figure 4:
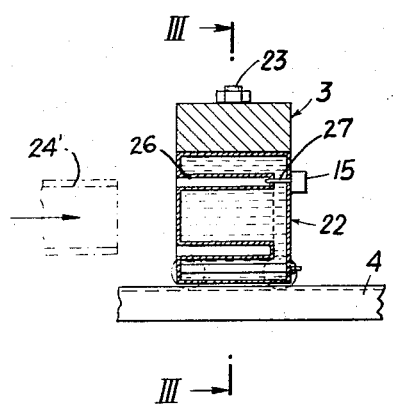
Figure 3:
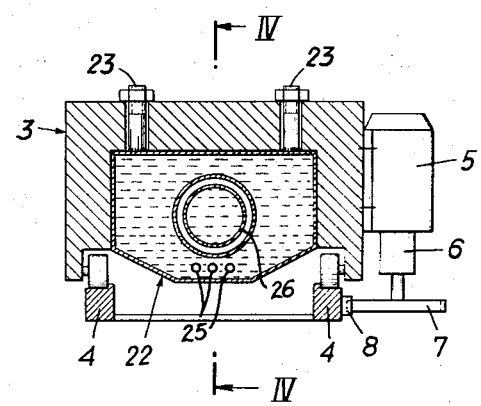

FIG. 1 is a top plan-view of a device according to the invention. FIG. 2 shows a section along line II—II of FIG. 1. FIGS. 3 and 4 show the preheating device for preheating the tube end to be deformed, FIG. 3 showing a section along line III—III of FIG. 4, and FIG. 4 showing a section along line IV–IV of FIG. 3.

As shown in FIG. 1, within the extrusion equipment, a tube discharge means 1 and, subsequently, a tube severing device 2, for instance a saw, is arranged behind the extruder (not shown), said tube severing device 2 serving for subdividing the tubular slab extruded by the extruder into tubes of the desired length. Seen in discharge direction of the tubular slab 24, a preheating device 3 is arranged behind the tube severing device 2 for being moved along a path on track means such as rails 4. The embodiment shown in FIG. 1 shows the preheating device 3 in an intermediate position between the end positions. The drive for the preheating device 3 consists, as is shown in FIG. 3, of a motor 5 connected to said preheating device 3, and having its shaft connected to a sprocket 7 via a magnetic clutch 6, said sprocket 7 being in engagement with a chain 8 connected to one of the rails 4.

As soon as the tubular slab extruded by the extruder protrudes from the tube severing device 2, the preheating device 3 is moving into position 3', shown by dashed lines in FIG. 1, and receiving the tube end emerging from the tube severing device 2 with its core still warm. Within the preheating device 3 a switch 15 is provided for being actuated by the leading end of the tubular slab entering the preheating device 3, as can be derived from FIG. 4. By actuating the switch 15, the drive for the preheating device is interrupted by deenergizing the magnetic clutch 6, so that, now, the extruded tubular slab may push the preheating device 3 with extrusion speed. Preheating of the tube end enclosed within the preheating device 3 is already effected during this movement of the preheating device 3.

Adjacent the rails 4 a switch 16 is arranged for being actuated by the preheating device 3 when reaching the position 3'' shown in FIG. 1 in dash-dotted lines. By actuating this switch 16, clamping jaws 17 provided within the tube severing means 2 are actuated for engaging the tubular slab, and when closing said clamping jaws 17 a switch 18, cooperating with said clamping jaws, is actuated, which in turn results in energizing the magnetic clutch 6 within the drive for the preheating device 3. Now, provision is made for shifting the preheating device 3 with a speed exceeding extrusion speed so that the preheating device 3 is drawn off the tube end and brought into the position 3''', also shown in FIG. 1 by dash-dotted lines. In this position, preheating device 3 contacts switch 19 to stop the motor 5 and simultaneously effect a reversal in the drive direction of the motor.

As soon as the tubular slab has completely been severed within the tube severing device 2, the clamping jaws 17 are disengaged from the tube, so that by actuating the switch 18 in a sense opposed to the previous sense, an ejector 9 is actuated for discharging the severed length of tube, which now is preheated at one of its ends, onto conveyor belts 10 which have been made operative by a switch 20 actuated by said ejector 9, and which deliver the tube into a clamping device 11 at the tube socket forming device 12. The tubes entering the clamping device 11 actuate a switch 21 which is arranged for stopping the conveyor belts 10 and for closing the clamping device 11. After having shaped the tube socket at the preheated tube end within the tube socket forming device 12 in a fully automatic manner, the finished tube is, by means of an ejector 13, put on a conveyor belt 14 and brought to a discharge position.

After having brought a tube onto the conveyor belts 10, the ejector 9, when returning to its rest position, again actuates switch 20, which results in starting the motor for driving the preheating device 3 in such a sense that this preheating device 3 is brought from position 3''' into position 3', in which the preheating device is ready for the following cycle of operation.

As is shown in FIGS. 3 and 4, the preheating device 3 is provided with an interchangeable insert 22 which is maintained in position by fixing means, such as screws 23 or the like. By interchanging various inserts 22, the preheating device 3 can be adapted to tubes of different diameters.

Said mentioned inserts 22 represent, according to the embodiment shown in the drawing, a container filled with a liquid, for instance oil. Within this container, an electric heating means 25 is provided for heating said liquid to a predetermined temperature sufficient for heating the tube ends to the desired temperature within the time interval at disposal. The annular void into which the end of the tube to be heated is to be introduced has been given the reference numeral 26. An actuating pin 27 of the switch 15 is protruding into this annular void 26, and will be actuated by the tube end 24' introduced into said void 26.

What we claim is:

1. Apparatus for forming a tube socket at one end of a tube of thermoplastic material comprising means for forming an endless tube by an extrusion process, means for severing said endless tube to a predetermined length to form said tube, means for heating said tube one end during the extrusion process and prior to operation of said severing means comprising a preheater mounted for movement with said tube during the extrusion process, and tube socket forming means for said tube one end operable after severing of said endless tube to a predetermined length to form said tube.

2. The apparatus of claim 1 wherein said preheater is positioned coaxially with said tube, said tube socket forming means being positioned beside said preheater outside of the path of travel of said preheater and tube.

3. The apparatus of claim 2 wherein said preheater further comprises reversible drive means for moving the preheater, and switch means for said reversible drive means, operable by contact with said preheater and said tube one end.

4. The apparatus of claim 3 wherein said drive means comprises a motor mounted on the preheater, a drive shaft extended from the motor, a sprocket on the free end of the drive shaft, track means beneath the preheater for guiding the preheater along a path parallel to the axis of the extruded endless tube, and means on said track means cooperating with said drive shaft sprocket for moving said preheater along said track means in response to operation of said drive motor.

5. The apparatus of claim 3 wherein said drive means includes a selectively operable magnetic clutch and a selectively operable magnetic brake.

6. The apparatus of claim 3 wherein said switch means comprise a first switch located interiorally of the preheater and operable by contact with said tube one end to disengage said drive means during said extrusion process whereby said preheater is driven by the endless tube being extruded and a second switch operable by contact with the preheater after the extrusion process whereby said preheater is driven by the endless tube being extruded, and a second switch operable by contact with the preheater after the extrusion process is completed for energizing said drive means whereby said preheater is disengaged from said tube one end.

7. The apparatus of claim 2 wherein ejection means are provided adjacent said tube socket forming means for laterally shifting said tube of predetermined length from the tube forming extrusion means to the tube socket forming means.

8. The apparatus of claim 2 wherein said preheater includes a removable tube end receptor, interchangeable for varying tube end diameters.

9. The apparatus of claim 8 wherein said tube end receptor comprises an outer shell for receiving the tube end, said shell defining an interior chamber adapted to be filled with a liquid.

10. The apparatus of claim 9 wherein said tube end receptor further includes means within said chamber for heating said liquid.

11. Apparatus for forming a tube socket at one end of a tube of thermoplastic material comprising means for forming an endless tube by an extrusion process, means for severing said endless tube to a predetermined length to form said tube, means for heating said tube one end during the extrusion process and prior to operation of said severing means including temperature control means whereby heating of said tube one end is completed prior to operation of said severing means, and tube socket forming means for said tube one end operable after severing of said endless tube to a predetermined length to form said tube.

* * * * *